(12) United States Patent
Huang et al.

(10) Patent No.: US 10,619,897 B2
(45) Date of Patent: Apr. 14, 2020

(54) REVERSING VALVE AND COOLING SYSTEM HAVING SAME

(71) Applicant: ZHEJIANG SANHUA CLIMATE AND APPLIANCE CONTROLS GROUP., LTD, Zhejiang (CN)

(72) Inventors: Songyan Huang, Zhejiang (CN); Qingyong Wang, Zhejiang (CN)

(73) Assignee: Zhejiang Sanhua Climate And Appliance Controls Group., Ltd, Zhejiang (CN)

( * ) Notice: Subject to any disclaimer, the term of this patent is extended or adjusted under 35 U.S.C. 154(b) by 226 days.

(21) Appl. No.: 15/574,042

(22) PCT Filed: Apr. 7, 2016

(86) PCT No.: PCT/CN2016/078690
§ 371 (c)(1),
(2) Date: Jan. 5, 2018

(87) PCT Pub. No.: WO2016/180111
PCT Pub. Date: Nov. 17, 2016

(65) Prior Publication Data
US 2018/0299173 A1 Oct. 18, 2018

(30) Foreign Application Priority Data

May 14, 2015 (CN) .......................... 2015 1 0250159
Nov. 27, 2015 (CN) .......................... 2015 1 0893338

(51) Int. Cl.
*F16K 11/07* (2006.01)
*F25B 41/04* (2006.01)
(Continued)

(52) U.S. Cl.
CPC ............ *F25B 41/046* (2013.01); *F16K 11/00* (2013.01); *F16K 11/07* (2013.01); *F16K 11/065* (2013.01);
(Continued)

(58) Field of Classification Search
CPC ......... Y10T 137/5544; Y10T 137/5617; Y10T 137/5689; Y10T 137/86614;
(Continued)

(56) References Cited

U.S. PATENT DOCUMENTS

| 723,801 | A | * | 3/1903 | Rauschenberg | ........ | F23L 15/02 |
| | | | | | | 137/310 |
| 2,974,682 | A | * | 3/1961 | Trask | ...................... | F25B 13/00 |
| | | | | | | 137/625.33 |

(Continued)

FOREIGN PATENT DOCUMENTS

| CN | 1181474 | 5/1998 |
| CN | 102758957 A | 10/2012 |

(Continued)

OTHER PUBLICATIONS

English translation of JP200046123A,Nov. 12, 2019, taken from Espacenet; Retrieved from the internet;<URL:https://worldwide.espacenet.com/?locale=en_EP> [retrieved on Nov. 12, 2019] (Year: 2019).*

(Continued)

*Primary Examiner* — Craig J Price
(74) *Attorney, Agent, or Firm* — McAndrews, Held & Malloy, Ltd.

(57) ABSTRACT

The present invention discloses a reversing value which includes a pilot valve and a main valve. The main valve includes: a valve body with a valve chamber, wherein the valve chamber is provided with a valve seat therein, and the valve seat is provided with a plurality of valve ports thereon;

(Continued)

a plurality of flow path ports are correspondingly communicated with the plurality of valve ports; a sliding valve core matching the valve seat. When the sliding valve core (60) slides to a second preset position, the D2 port is communicated with the C port, and the S port is communicated with the E port. The present invention also discloses a cooling system with the reversing valve. The reversing valve can effectively solve the problem in the prior art that the pressure of high pressure fluid in a valve chamber of a reversing valve is unstable in the switching process.

12 Claims, 7 Drawing Sheets

(51) Int. Cl.
*F16K 11/00* (2006.01)
*F16K 11/065* (2006.01)

(52) U.S. Cl.
CPC ............... *F25B 2313/02741* (2013.01); *Y10T 137/86582* (2015.04)

(58) Field of Classification Search
CPC ..... Y10T 137/86839; Y10T 137/86582; Y10T 137/86726; F25B 41/046; F25B 2313/02741; F25B 2313/023; F25B 2313/025; F25B 13/00; F25B 41/04; F16K 11/00; F16K 11/07; F24F 3/153
USPC .............. 137/309–311, 625.43; 62/159, 160, 62/324.1–325
See application file for complete search history.

(56) References Cited

U.S. PATENT DOCUMENTS

| | | | | |
|---|---|---|---|---|
| 3,293,880 A * | 12/1966 | Greenawalt | ........... | F16K 31/426 62/324.6 |
| 3,369,790 A * | 2/1968 | McHale | ................ | F15B 13/043 251/78 |
| 3,400,736 A * | 9/1968 | Bastle | .................. | F25B 41/046 137/625.29 |
| 3,867,960 A | 2/1975 | Hosoda et al. | | |
| 3,894,561 A * | 7/1975 | Thornbery | .......... | F16K 11/0655 137/625.29 |
| 4,027,700 A * | 6/1977 | Perkins | ................. | F25B 41/046 137/625.66 |
| 4,248,058 A * | 2/1981 | Bauer | ..................... | F25B 13/00 137/625.43 |
| 4,306,422 A * | 12/1981 | Korycki | .................. | F25B 13/00 137/625.43 |
| 4,318,425 A * | 3/1982 | Marks | ................... | F25B 41/046 137/625.43 |
| 4,564,045 A * | 1/1986 | Koch | ................. | F16K 31/1225 137/625.25 |
| 4,644,760 A * | 2/1987 | Aoki | ..................... | F25B 41/046 137/625.43 |
| 6,505,647 B2 * | 1/2003 | Sasada | ................ | F16K 11/0743 137/625.43 |
| 7,124,777 B2 * | 10/2006 | Moreno | ................... | F16K 11/06 137/625.43 |
| 7,896,029 B2 * | 3/2011 | Yoshimura | .......... | F16K 11/0655 137/625.43 |
| 8,770,225 B2 * | 7/2014 | Zhang | ................. | F16K 11/0655 137/625.43 |
| 10,018,382 B2 * | 7/2018 | Song | ....................... | F25B 13/00 |
| 2015/0354713 A1 * | 12/2015 | Hancock | ................. | F25B 13/00 62/77 |
| 2019/0120527 A1 * | 4/2019 | Haikawa | ............... | F25B 31/008 |

FOREIGN PATENT DOCUMENTS

| | | |
|---|---|---|
| CN | 104180020 | 12/2014 |
| CN | 104180020 A | 12/2014 |
| CN | 104214369 | 12/2014 |
| EP | 0840018 A2 | 5/1998 |
| GB | 966836 | 8/1964 |
| JP | H07119852 A | 5/1995 |
| JP | H08170865 A | 7/1996 |
| JP | 2000046213 A | 2/2000 |
| JP | 2015075211 A | 4/2015 |

OTHER PUBLICATIONS

International Search Report corresponding to International Patent Application No. PCT/CN2016/078690, dated Jun. 23, 2016.
Extended European search report, dated Mar. 20, 2019, in European application No. 16791961.2.

\* cited by examiner

REVERSING VALVE AND COOLING SYSTEM HAVING SAME

CROSS-REFERENCE TO RELATED APPLICATIONS/INCORPORATION BY REFERENCE

This application is a 371 of International Patent Application No. PCT/CN2016/078690, filed Apr. 7, 2016, entitled "REVERSING VALVE AND COOLING SYSTEM HAVING SAME," which claims priority to Chinese Patent Application No. 201510250159.3, filed May 14, 2015 and Chinese Patent Application No. 201510893338.9, filed Nov. 27, 2015. The above-identified applications are hereby incorporated herein by reference in their entirety.

TECHNICAL FIELD

The present invention relates to the field of valves, in particular to a reversing valve and a refrigerating system with the same.

BACKGROUND

A reversing valve applied to a refrigerating system is mainly composed of a pilot valve and a main valve. In the process of control, reversing of the main valve is realized by means of the pilot valve to switch a circulation direction of a cooling medium, in such a manner, a heat pump refrigerating system can switch between a cooling working state and a heating working state, thus achieving the intention of one machine two uses, namely cooling in summer and heating in winter.

FIG. 1 is a structure diagram of a typical reversing valve applied to a refrigerating system. As shown in FIG. 1, the reversing valve comprises a main valve 100 and a pilot valve 200. A sliding valve core 104 of the main valve 100 is set in a valve chamber 107, and the sliding valve core 104 relatively slides abutting against a valve seat 105. A connecting pipe 106c, a connecting pipe 106s and a connecting pipe 106e are welded on the valve seat 105 and communicated with the valve chamber 107; a connecting pipe 106d is welded on the valve body and communicated with the valve chamber 107.

The connecting pipe 106d is communicated with a vent port of a compressor 110, the connecting pipe 106s is communicated with a suction port of the compressor 110, the connecting pipe 106e is communicated with an indoor heat exchanger 140, and the connecting pipe 106c is communicated with an outdoor heat exchanger 120. A piston component 101 in the main valve 100 drives the valve core to slide relative to the valve seat 105, in such a manner, switching between the cooling working state and the heating working state is realized. When the system needs to switch to the cooling working state, a connecting rod 103 drives the sliding valve core 104 to slide to the left side, the piston component 101 at the left end abuts against an end cap of the left end, the connecting pipe 106e is communicated with the connecting pipe 106s, and the connecting pipe 106d is communicated with the connecting pipe 106c; at this point, a flow path of refrigerant in the system is: the compressor 110→the connecting pipe 106d→the connecting pipe 106c→the outdoor heat exchanger 120→a throttling element 130→the indoor heat exchanger 140→the connecting pipe 106e→the connecting pipe 106s→the compressor 110. When the system needs to switch to the heating working state, the sliding valve core 104 slides to the right side, the piston component 101 at the right end abuts against the end cap of the right end, the connecting pipe 106c is communicated with the connecting pipe 106s, and the connecting pipe 106d is connected with the connecting pipe 106e; at this point, the flow path of refrigerant is: the compressor 110→the connecting pipe 106d→the connecting pipe 106e>the indoor heat exchanger 140→the throttling element 130→the outdoor heat exchanger 120→the connecting pipe 106c→the connecting pipe 106s→the compressor 110.

In the refrigerating system adopting the prior art, the working process of the whole system is: the compressor 110→the connecting pipe 106d→the connecting pipe 106c→the outdoor heat exchanger 120→the throttling element 130→the indoor heat exchanger 140→the connecting pipe 106e→the connecting pipe 106s→the compressor 110. The above process is a working cycle, and the existing air conditioner will repeat the working cycle in practical work.

In the refrigerating system adopting the prior art, a high pressure medium at an outlet end of the compressor enters the valve chamber 107 through the connecting pipe 106d, and forms a channel through the connecting pipe 106e or the connecting pipe 106e, so the valve chamber 107 serves as a part of a refrigerant switching channel; in the valve chamber 107, the sliding valve core 104 abuts against the valve seat 105 through an elastic flake; in the switching process of the system, the pressure in the valve chamber 107 is in an unstable state, which influences the sliding valve core 104 to abut against the valve seat 105, and then causes the instability of reversing. So, how to improve the structure of the reversing valve and adjust the flow layout of the refrigerating system to optimize design is the problem to be solved by the skilled in the art.

Moreover, it can be seen from the above working process that there is only one connecting pipe is matched with the vent port of the compressor in the reversing valve, so the refrigerating system that the reversing valve can adapt contains little variety, namely only the refrigerating system having one indoor heat exchanger and one outdoor heat exchanger. After the refrigerating system is changed, for example, it is changed to having one indoor heat exchanger and two outdoor heat exchangers, the reversing valve cannot adapt.

SUMMARY

The present invention is mainly intended to provide a reversing valve and a refrigerating system with the same, for solving the problem in the prior art that the pressure of high pressure fluid in a valve chamber of a reversing valve is unstable in the switching process or the problem that a reversing cannot adapt to other types of refrigerating systems.

To this end, according to an aspect of the present invention, a reversing valve is provided, which comprises a pilot valve and a main valve; the main valve comprises: a valve body with a valve chamber, wherein the valve chamber is provided with a valve seat therein, and the valve seat is provided with a plurality of valve ports thereon; a plurality of flow path ports are correspondingly communicated with the plurality of valve ports; a sliding valve core is matched with the valve seat; and a drive component driving the sliding valve core to selectively open or close the valve ports; the plurality of valve ports comprise a first valve port, a second valve port, a third valve port, a fourth valve port, and a fifth valve port; the plurality of flow path ports comprise an S port which is communicated with the first valve port, an E port is communicated with the second valve port, a C port is communicated with the third valve port, a D1 port is communicated with the fourth valve port and a D2 port is communicated with the fifth valve port; when the sliding valve core slides to a first preset position, the D1 port is communicated with the E port, and the S port is communicated with the C port; when the sliding valve core slides to a second preset position, the D2 port is communicated with the C port, and the S port is communicated with the E port.

Furthermore, when the sliding valve core is at the first preset position, the D2 port is hermetically communicated with the valve chamber; when the sliding valve core is at the second preset position, the D1 port is hermetically communicated with the valve chamber.

Furthermore, the sliding valve core is separately provided with a first channel and a second channel thereon; when the sliding valve core is at the first preset position, the D1 port and the E port are communicated through the first channel, and the S port and the C port are communicated through the second channel; when the valve core is at the second preset position, the D2 port and the C port are communicated through the second channel, and the S port and the E port are communicated through the first channel.

Furthermore, the reversing valve further comprises a spring pressing flake pressing the sliding valve core against the valve seat; the spring pressing flake is provided with first elastic pressing units which are symmetrically arranged at two sides of the length direction of the spring pressing flake; the sliding valve core is an integrated structure, and there are first pressing slots are matched with the first elastic pressing units at two sides of the length direction of the sliding valve core.

Furthermore, the spring pressing flake is further provided with a second elastic pressing unit which is arranged along the width direction of the spring pressing flake; there is also a second pressing slot is matched with the second elastic pressing unit at the width direction of the approximately central part of the sliding valve core.

Furthermore, the reversing valve further comprises the spring pressing flake pressing the sliding valve core against the valve seat, wherein the sliding valve core comprises a first valve core provided with the first channel and a second valve core provided with the second channel; the spring pressing flake comprises a first spring pressing flake is matched with the first valve core and a second spring pressing flake is matched with the second valve core.

Furthermore, the valve chamber is isolated from the first channel and the second channel hermetically.

Furthermore, the sliding valve core comprises a first valve core unit and a second valve core unit which are set at interval and move synchronously; the first valve core unit is matched with the first valve port, the second valve port and the third valve port; the second valve core unit is matched with the fourth valve port and the fifth valve port; when the sliding valve core is at the first preset position, the first valve port and the third valve port are communicated through an internal channel of the first valve core unit, the second valve port and the fourth valve port are communicated through the valve chamber, and the second valve core unit blocks the fifth valve port; when the sliding valve core is at the second preset position, the first valve port and the second valve port are communicated through the internal channel in the first valve core unit, the third valve port and the fifth valve port are communicated through the valve chamber, and the second valve core unit blocks the fourth valve port.

Furthermore, the drive component comprises a connecting rod; the first valve core unit and the second valve core unit are installed on the connecting rod; the connecting rod is provided with a first installing hole for installing the first valve core unit and a second installing hole for installing the second valve core unit.

Furthermore, the second valve core unit has a valve core body and a connecting unit; the radial dimension of the connecting unit is less than the radial dimension of the valve core body.

Furthermore, a pressure spring is set between the connecting rod and the second valve core unit.

Furthermore, a surface, facing the valve seat, of the second valve core unit has a recess.

Furthermore, the valve chamber is cylinder-shaped; the first valve port, the second valve port, the third valve port, the fourth valve port and the fifth valve port are set at one side of the valve chamber, and are linearly distributed in the axis direction of the valve chamber.

According to another aspect of the present invention, a refrigerating system is provided, which comprises: a compressor, a first heat exchanger, a second heat exchanger, and a throttle valve the throttle valve makes the first heat exchanger communicating with the second heat exchanger; the refrigerating system further comprises an auxiliary heat exchanger and the reversing valve; an inlet end of the compressor is communicated with the first valve port of the reversing valve; an outlet end of the compressor is communicated with the fourth valve port and the fifth valve port of the reversing valve respectively; the first heat exchanger is communicated with the third valve port of the reversing valve; the second heat exchanger is communicated with the second valve port of the reversing valve; the auxiliary heat exchanger is set between the outlet end of the compressor and the fourth valve port or between the outlet end of the compressor and the fifth valve port.

According to the reversing valve and the refrigerating system using the reversing valve disclosed in the present invention, two independent output pipes of the compressor are set, one of which is used as a part of cooling flow path, and the other is directly communicated with the valve chamber, and the valve chamber does not serve as a part of the cooling flow path; in such a manner, in the switching process of the refrigerating system, the valve chamber can keep the stability of pressure, and the reliability of reversing of the refrigerating system is improved greatly.

By using the technical solution of the present invention, the sliding valve core is set in the valve chamber, and the sliding valve core comprises the first valve core unit and the second valve core unit which are set at interval and move synchronously; the first valve core unit is matched with the first valve port, the second valve port and the third valve port; the second valve core unit is matched with the fourth valve port and the fifth valve port. When the reversing valve works, the sliding valve core has to working positions, namely the first preset position and the second preset position. When the sliding valve core is at the first preset position, the first valve port and the third valve port are communicated through the internal channel in the first valve core unit, the second valve port and the fourth valve port are communicated through the valve chamber, and the second valve core unit blocks the fifth valve port; when the sliding valve core is at the second preset position, the first valve port and the second valve port are communicated through the internal channel in the first valve core unit, the third valve port and the fifth valve port are communicated through the valve chamber, and the second valve core unit blocks the fourth valve port. In the technical solution of the application, it is possible to make both the fourth valve port and the fifth valve port are communicated with the vent port of the compressor, so that the reversing valve can adapt to other types of refrigerating systems, and the application scope is expanded.

The technical solution of the reversing valve and the refrigerating system using the reversing valve provided in the present invention is advantaged in that: by using the setting of two independent output pipes of the compressor, whether the reversing valve is at the first preset position or the second preset position, the valve chamber keeps stable and sealed high pressure fluid therein, thus enabling the sliding valve core to effectively press against the valve seat, avoiding a fluid interference phenomenon, and ensuring stationarity of reversing of the refrigerating system and working reliability.

The reversing valve and the refrigerating system using the reversing valve provided in the present invention is further advantaged in that: by using the setting of two independent output pipes of the compressor, an auxiliary heat exchanger can be serially connected on one of the two output pipes, so when an air conditioning system works, high-temperature and high-pressure gas output from the outlet of the compressor goes through the auxiliary heat exchanger and releases heat. The heat released from the gas can be used for heating other substances, which can further save energy and reduce emission, thus achieving the effect of saving energy and reducing emission.

BRIEF DESCRIPTION OF THE DRAWINGS

The accompanying drawings constituting a part of the application are used for providing a deeper understanding of the present invention; schematic embodiments of the present invention and description thereof are used for illustrating the present invention and not intended to form an improper limit to the present invention. In the accompanying drawings.

Signs in FIG. 2 to FIG. 5b are explained as follows:

1000 represents a reversing valve; 1100 represents a main valve; 1200 represents a pilot valve; 10 represents a valve body; 11 represents an end cap; 20 represents a valve chamber; 30 represents a valve seat; 40 represents a valve port; 41 represents a first valve port; 42 represents a second valve port; 43 represents a third valve port; 44 represents a fourth valve port; 45 represents a fifth valve port; 50 represents a flow path port; S represents an S port; E represents an E port; C represents a C port; D1 represents a D1 port; D2 represents a D2 port; 60 represents a sliding valve core; 61 represents a first channel; 62 represents a second channel; 63 represents a first pressing slot; 64 represents a second pressing slot; 70 represents a drive component; 71 represents a connecting rod; 72 represents a piston; 80 represents a spring pressing flake; 81 represents an opening; 82 represents a first elastic pressing unit; 83 represents a second elastic pressing unit; 1 represents a compressor; 2 represents a throttle valve; 3 represents a first heat exchanger; 4 represents a second heat exchanger; and 6 represents an auxiliary heat exchanger.

Signs in FIG. 6 to FIG. 16 are explained as follows:

1 represents a compressor; 2 represents a throttle valve; 3 represents a first heat exchanger; 4 represents a second heat exchanger; 6 represents an auxiliary heat exchanger; 10 represents a valve body; 30 represents a valve seat; 43 represents a third valve port; 41 represents a first valve port; 42 represents a second valve port; 45 represents a fifth valve port; 44 represents a fourth valve port; 91 represents a first valve core unit; 92 represents a second valve core unit; 921 represents a valve core body; 922 represents a connecting unit; C represents a C port; S represents an S port; E represents an E port; D2 represents a D2 port; D1 represents a D1 port; 60 represents a connecting rod; 711 represents a first installing hole; 712 represents a second installing hole; and 93 represents a pressure spring.

DETAILED DESCRIPTION OF THE EMBODIMENTS

Note that, the embodiments of the present invention and the characteristics in the embodiments can be combined under the condition of no conflicts. The present invention is elaborated below with reference to the accompanying drawings and embodiment.

The accompanying drawings FIG. 2 to FIG. 5b show a structure diagram of embodiment 1 of a reversing valve used in a refrigerating system according to the present invention.

Figure 1:
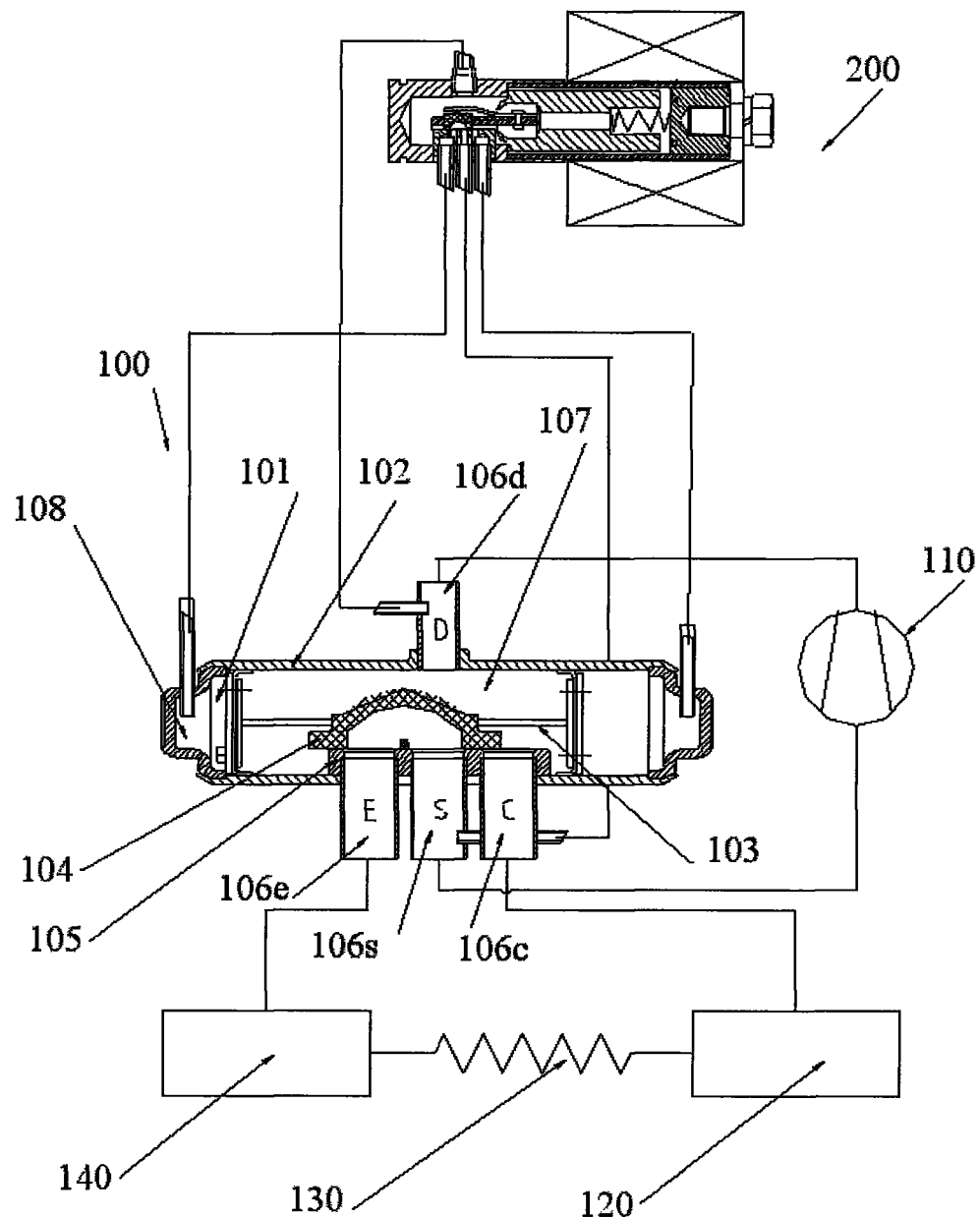
FIG. 1 is a structure diagram of a reversing valve used in a refrigerating system according to the prior art.
Figure 2:
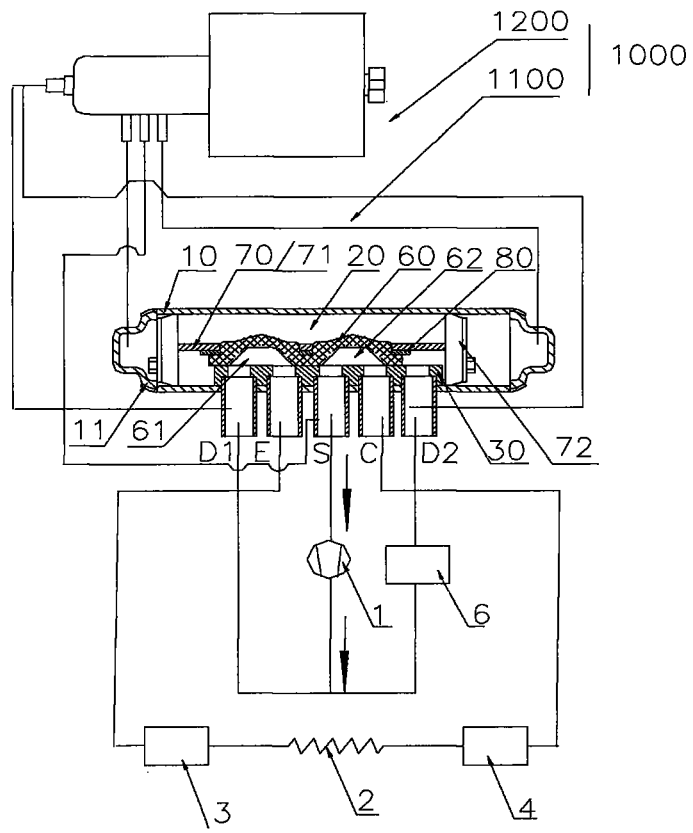
FIG. 2 is a structure diagram of embodiment 1 of a reversing valve used in a refrigerating system according to the present invention.

As shown in FIG. 2, the reversing valve 1000 of embodiment 1 comprises a main valve 1100 and a pilot valve 1200. A valve chamber 20 of the main valve 1100 is formed by respectively welding an end cap 11 at two ends of a metal-tube-shaped valve body 10. The valve chamber 20 is provided with a drive component 70 therein, and the drive component 70 is composed of a connecting rod 71 and two pistons 72 fixed at two ends of the connecting rod 71. The two pistons 72 separate the valve chamber 20 of the valve body 10 into a main chamber and left or right chambers. A valve seat 30 is welded on the valve body 10, and a sliding valve core 60 relatively slides pressing against the valve seat 30. There are a plurality of valve ports 40 set on the valve seat 30, and the plurality of valve ports comprise a fourth valve port 44, a second valve port 42, a first valve port 41, a third valve port 43 and a fifth valve port 45 in sequence.

There are a plurality of ports welded on the valve seat 30 as flow path ports, and the flow path ports comprise a D1 port, an E port, an S port, a C port and a D2 port which are communicated with the fourth valve port 44, the second valve port 42, the first valve port 41, the third valve port 43 and the fifth valve port 45 respectively.

On the configuration of the refrigerating system, the D1 port and the D2 port are communicated with a vent port of the compressor 1 (in the present embodiment, the D2 port is communicated with the vent port of the compressor 1 through an auxiliary heat exchanger 6), the S port is communicated with a suction port of the compressor 1; the E port is communicated with a first heat exchanger 3, and the C port is communicated with a second heat exchanger 4. The sliding valve core 60 is separately provided with a first channel 61 and a second channel 62 thereon; the sliding valve core 60 presses against the valve seat 30 to isolate and seal the first channel 61 and the second channel 62 from the valve chamber 20.

When the system switches to a working state (a first preset position) as shown in FIG. 2, a flow path of refrigerant in the system is: a high pressure fluid medium compressed by the compressor→the D1 port→the first channel 61→the E port→the first heat exchanger 3→the throttle valve 2→the second heat exchanger 4→the C port→the second channel 62→the S port→the inlet port of the compressor 1; at the same time, the other high pressure fluid medium compressed by the compressor→the auxiliary heat exchanger 6→the D1 port→the valve chamber 20.

When the system needs to switch to the working state (a second preset position), the reversing of capillary pressure of the pilot valve 1200 switches the pressure difference of the left and right chambers of the valve chamber 20, and the drive component 70 drives the sliding valve core 60 to slide to the right side (not shown in the figures), at this point, the flow path of refrigerant in the system is: the high pressure fluid medium compressed by the compressor→the D2 port→the second channel 62→the C port→the second heat exchanger 4→the throttle valve 2→the first heat exchanger 3→the E port→the first channel 61→the S port→the compressor 1; at the same time, the other high pressure fluid medium compressed by the compressor→the D1 port→the valve chamber 20.

It can be seen from the above path of fluid medium that whether the reversing valve is at the first preset position or the second preset position, the valve chamber 20 has stable and sealed high pressure fluid, thus enabling the sliding valve core 60 to press against the valve seat 30 in coordination with the pressure of the pressing flake, avoiding a fluid interference phenomenon in the reversing process, and ensuring stationarity of reversing of the refrigerating system and working reliability.

Furthermore, because two independent output pipes D1 and D2 of the compressor are set, and the auxiliary heat exchanger 6 is serially connected on one output pipe, when working, the refrigerating system can be set at the first preset position or the second preset position (usually in a cooling environment). The high-temperature and high-pressure gas output from the outlet of the compressor goes through the auxiliary heat exchanger and releases heat. The heat released from the gas can be used for heating other substances, which can further save energy and reduce emission, thus achieving the effect of saving energy and reducing emission.

Figure 3:
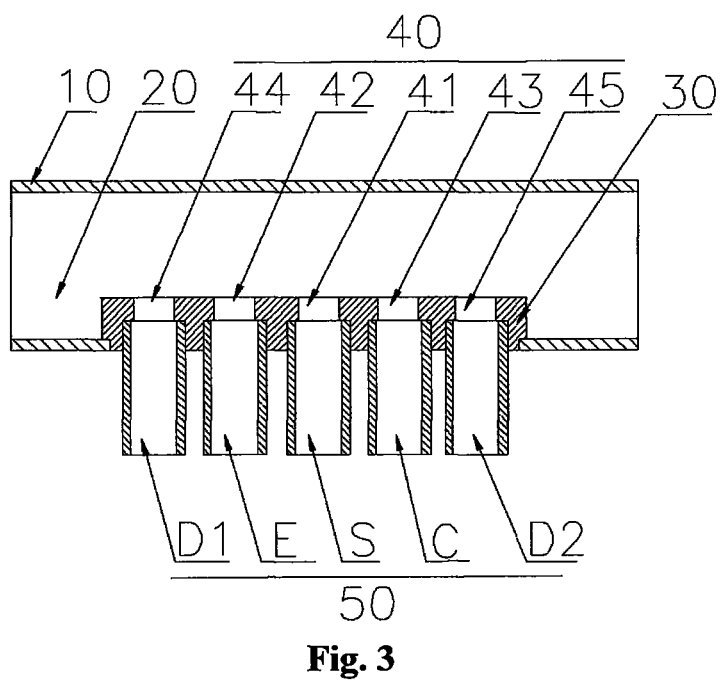
FIG. 3 is a partial structure diagram of a valve body and a valve seat of the reversing valve in FIG. 2.
Figure 4A:
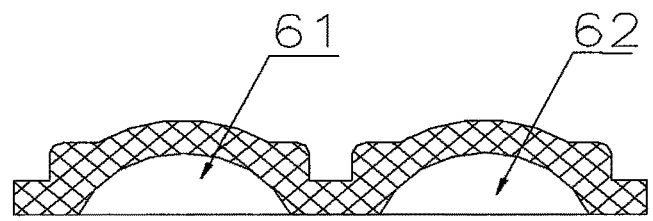
FIG. 4a is a front view of the structure of a sliding valve core of the reversing valve in FIG. 2.
Figure 4B:
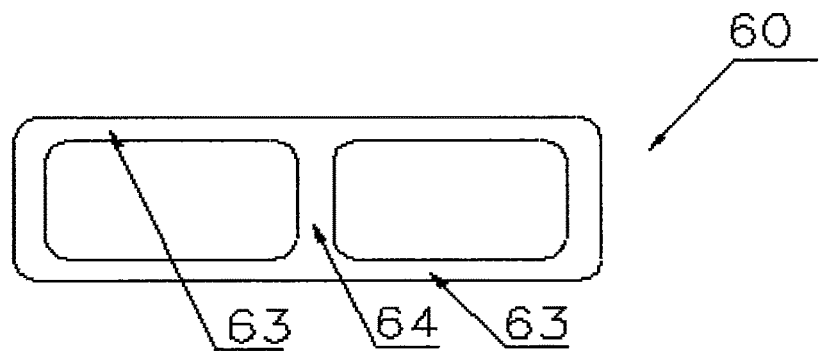
FIG. 4b is a top view of the structure of a sliding valve core of the reversing valve in FIG. 2.
Figure 5A:
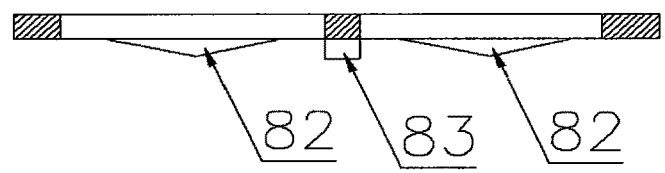
FIG. 5a is a front view of the structure of a spring pressing flake of the reversing valve in FIG. 2.
Figure 5B:
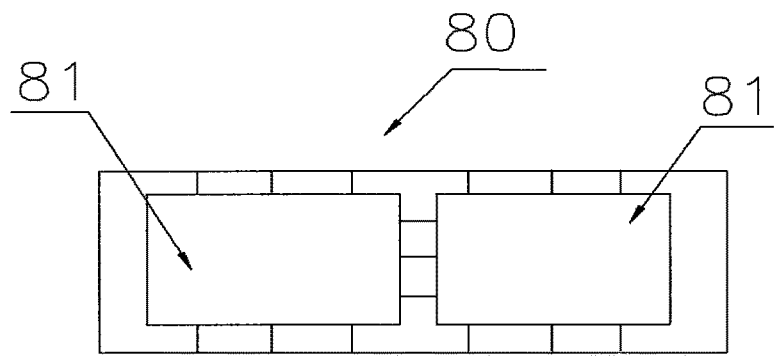
FIG. 5b is a bottom view of the structure of a spring pressing flake of the reversing valve in FIG. 2.

FIG. 3 is a partial structure diagram of a valve body and a valve seat of the reversing valve in FIG. 2; FIG. 4a and FIG. 4b are a front view and a top view of the structure of a sliding valve core of the reversing valve in FIG. 2; and FIG. 5a and FIG. 5b are a front view and a bottom view of the structure of a spring pressing flake of the reversing valve in FIG. 2.

As shown in FIG. 3, FIG. 4a, FIG. 4b, FIG. 5a and FIG. 5b, in the present embodiment, the five valve ports (the first valve port 41, the second valve port 42, the third valve port 43, the fourth valve port 44 and the fifth valve port 45) on the valve seat 30 are set at one side of the valve chamber 20 and linearly arranged in the axis direction of the valve chamber 20. The D1 port, the E port, the S port, the C port and the D2 port are directly welded on the valve seat 30, and are communicated with the five valve ports respectively. So the five ports can be welded with the valve seat 30 and the valve body 10 once, it is convenient for the switching of the sliding valve core 60, and the processing technology is convenient.

In the present embodiment, as a preferred embodiment, the sliding valve core 60 adopts an integrated structure, as shown in FIG. 4a to FIG. 5b; the sliding valve core 60 is provided with two bowl-shaped structures in the axis of the length direction as the first channel 61 and the second channel 62. At the side contrary to the bowl-shaped structures, there are first slots 63 at two sides in the axis of the length direction; and there are second pressing slots 64 between the first channel 61 and the second channel 62 in the width direction at the approximately central part of the sliding valve core 60.

A spring pressing flake 80 is usually made of elastic metal, for example, a stainless steel flake. The spring pressing flake 80 is approximately of rectangular structure, and is set between the connecting rod 71 of the drive component 70 and the sliding valve core 60; there are two openings 81 set in parallel in the length direction of the spring pressing flake, and the two openings 81 correspond to the bowl-shaped structures of the sliding valve core 60, which is convenient to clamp the sliding valve core 60 with the spring pressing flake 80.

There are first elastic pressing units 82 set at two sides in the axis of the length direction of the spring pressing flake 80, and the first elastic pressing units 82 press the first pressing slots 63 of the sliding valve core 60. There is a second elastic pressing unit 83 set between the two openings 81 on the spring pressing flake 80, and the elastic pressing unit 83 presses the second pressing slot 64 of the sliding valve core 60. Such a matching way can enable the sliding valve core 60 to press against the valve seat 30 reliably.

Certainly, the ordinary skilled in the art can also make some extensions on the basis of the above embodiment; for example, on the configuration of the refrigerating system, the D1 port and the D2 port are directly communicated with the vent port of the compressor 1; for another example, the sliding valve core adopts a separate structure, comprising a first valve core and a second valve core which have the same structure, and the first valve core and the second valve core respectively press through an independent spring. The above solution can also solve the problem to be solved by the present invention, which will not be repeated here.

FIG. 6 to FIG. 16 show a structure diagram of a reversing valve of embodiment 2.

Figure 6:
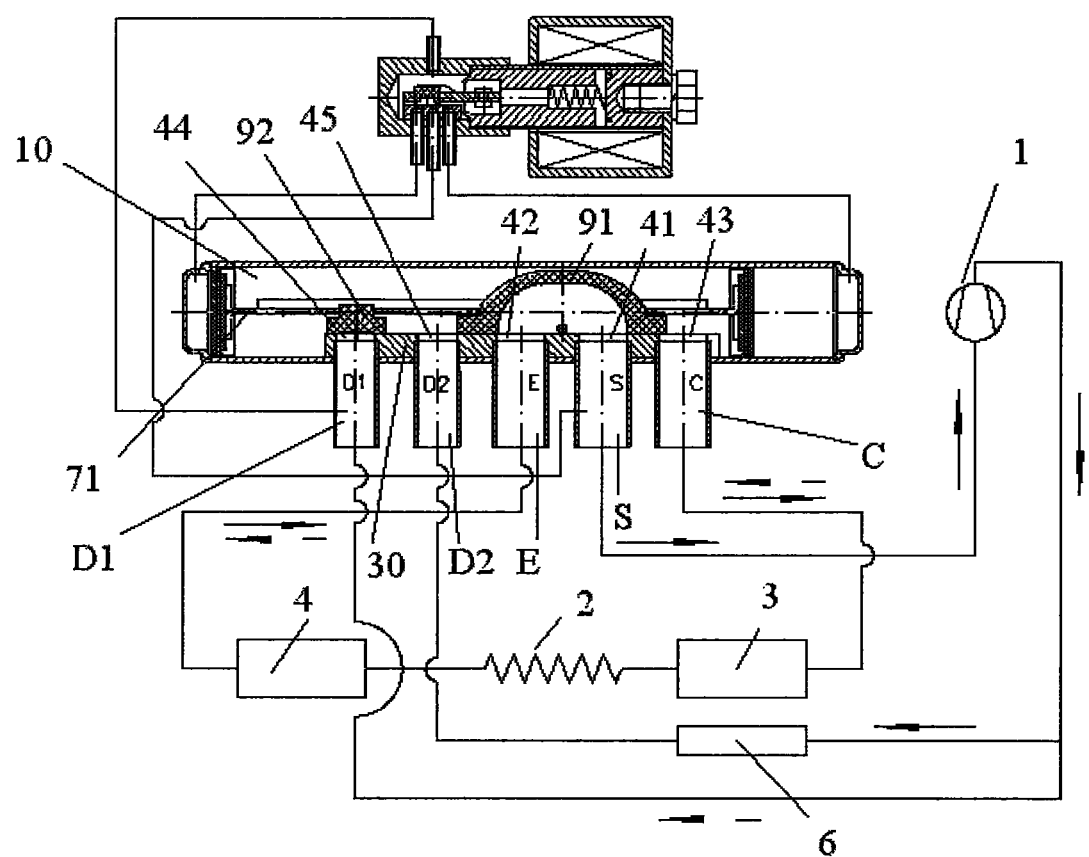
FIG. 6 is a structure diagram of embodiment 2 of a reversing valve according to the present invention.

As shown in FIG. 6, the reversing valve of the embodiment 2 comprises the valve body 10 with the valve chamber and the sliding valve core; wherein the valve chamber is provided with the valve seat 30 therein, and the valve seat 30 is provided with a plurality of valve ports thereon; the plurality of valve ports comprise the first valve port 41, the second valve port 42, the third valve port 43, the fourth valve port 44, and the fifth valve port 45. The third valve port 43, the first valve port 41, the second valve port 42, the fifth valve port 45 and the fourth valve port 44 are arranged in sequence along the axis direction of the valve body 10.

The sliding valve core is set in the valve chamber and is matched with the valve seat 30; the sliding valve core comprises a first valve core unit 91 and a second valve core unit 92 which are set at interval and move synchronously; the first valve core unit 91 is matched with the first valve port 41, the second valve port 42 and the third valve port 43; the second valve core unit 92 is matched with the fourth valve port 44 and the fifth valve port 45. Wherein, the sliding valve core has the first preset position and the second preset position; when the sliding valve core is at the first preset position (not shown in the figures), the first valve port 41 and the third valve port 43 are communicated through the internal channel of the first valve core unit 91, the second valve port 42 and the fourth valve port 44 are communicated through the valve chamber, and the second valve core unit 92 blocks the fifth valve port 45; when the sliding valve core is at the second preset position (shown in FIG. 6), the first valve port 41 and the second valve port 42 are communicated through the internal channel in the first valve core unit 91, the third valve port 43 and the fifth valve port 45 are communicated through the valve chamber, and the second valve core unit 92 blocks the fourth valve port 44.

By using the technical solution of the present invention, the sliding valve core is set in the valve chamber, and the sliding valve core comprises the first valve core unit 91 and the second valve core unit 92 which are set at interval and move synchronously, and each valve core unit is matched with the corresponding valve port on the valve seat 30. When the reversing valve works, the sliding valve core has two working positions. When the sliding valve core is at the first preset position, the first valve port 41 and the third valve port 43 are communicated through the internal channel of the first valve core unit 91, the second valve port 42 and the fourth valve port 44 are communicated through the valve chamber, and the second valve core unit 92 blocks the fifth valve port 45. When the sliding valve core is at the second preset position, the first valve port 41 and the second valve port 42 are communicated through the internal channel in the first valve core unit 91, the third valve port 43 and the fifth valve port 45 are communicated through the valve chamber, and the second valve core unit 92 blocks the fourth valve port 44. In the technical solution of the present invention, it is possible to make both the fourth valve port and the fifth valve port are communicated with the vent port of the compressor, so that the reversing valve can adapt to other types of refrigerating systems, and the application scope is expanded.

Figure 9:
FIG. 9 is a length direction section structure diagram of a valve body of the reversing valve in FIG. 6.
Figure 10:
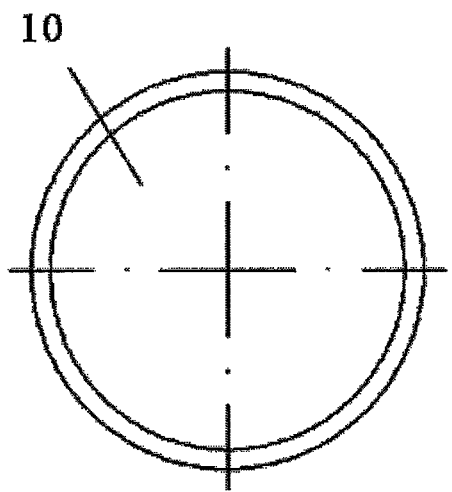
FIG. 10 is a side view of the valve body in FIG. 9.

Preferably, as shown in FIG. 9 and FIG. 10, the valve body 10 adopts a metal tube material, on which five holes are processed at the same circumferential position by punching, lathing, drilling and other techniques according to designed axial gap.

Figure 11:
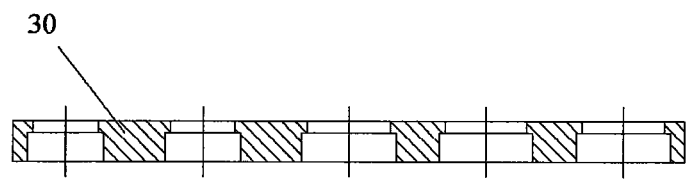
FIG. 11 is a length direction section structure diagram of a valve seat of the reversing valve in FIG. 6.
Figure 12:
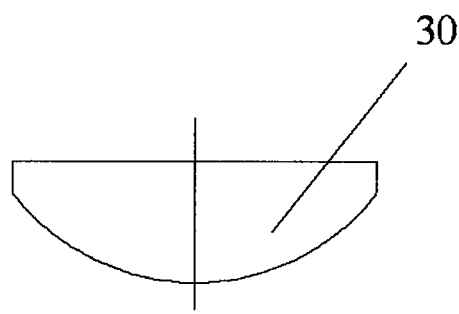
FIG. 12 is a side view of the valve seat in FIG. 11.

Preferably, as shown in FIG. 11 and FIG. 12, the valve seat 30 adopts a drawn or rolled D-shaped metal bar (or replaced with a semi-finished product obtained by casting, forging or other techniques), on which five stepped holes are processed at the same circumferential position by lathing, drilling and other techniques according to designed axial gap. The moving plane between the valve seat 30 and the sliding valve core can adopt different processing technologies and flows according to the different materials of the valve seat 30. Specifically, if the valve seat 30 adopts brass, the moving plane is broached after being welded with other parts; if the valve seat 30 adopts stainless steel, the moving plane is ground before being welded, namely in a part state. By processing the moving plane between the valve seat 30 and the sliding valve core, dynamic sealing between the valve seat 30 and the sliding valve core is ensured, and then frictional resistance between the valve seat 30 and the sliding valve core is reduced.

Figure 7:
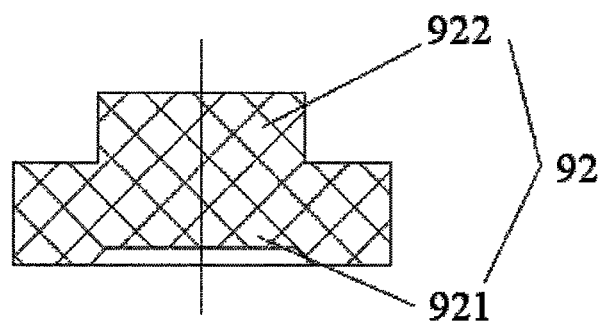
FIG. 7 is a longitudinal section structure diagram of a second valve core unit of the reversing valve in FIG. 6.
Figure 8:
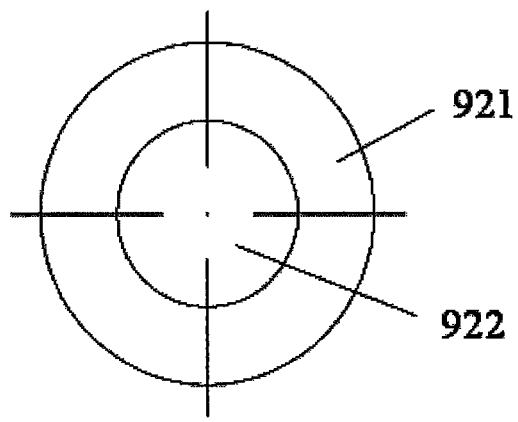
FIG. 8 is a top view of the second valve core unit in FIG. 7.

Preferably, as shown in FIG. 7 and FIG. 8, the sliding valve core is made of high polymer materials like nylon or PPS, and adopts the techniques like injection molding or processing by a bar turning machine. The moving plane between the sliding valve core and the valve seat 30 needs to be processed by cutting, so as to ensure its flatness and surface roughness, ensure the dynamic sealing, and reduce the frictional resistance between the valve seat 30 and the sliding valve core.

As shown in FIG. 6, FIG. 9 and FIG. 10, in the present embodiment, the third valve port 43, the first valve port 41, the second valve port 42, the fifth valve port 45 and the fourth valve port 44 are set at one side of the valve chamber and linearly arranged in the axis direction of the valve chamber. The above setting enables the sliding valve core to realize the switching between the first preset position and the second preset position by only moving along the axis direction of the valve chamber. The above structure is simple in structure, space-saving, and easy to be realized.

As shown in FIG. 6, in the present embodiment, the reversing valve further comprises a drive component for driving the sliding valve core to move. The above setting enables the sliding valve core to switch between the first preset position and the second preset position.

Figure 13:
FIG. 13 is a length direction section structure diagram of a connecting rod of the reversing valve in FIG. 6.
Figure 14:
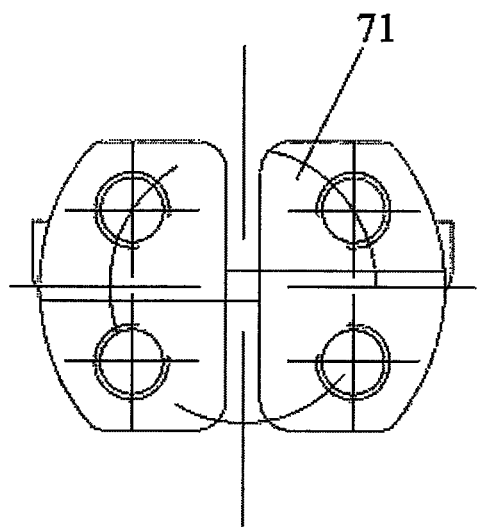
FIG. 14 is a side view of the connecting rod in FIG. 13.

As shown in FIG. 6, FIG. 13 and FIG. 14, in the present embodiment, the drive component comprises the connecting rod 71, on which the first valve core unit 91 and the second valve core unit 92 are installed. The above structure makes the drive component drive the connecting rod 71 to move in the axis direction of the valve chamber, so that the first valve core unit 91 and the second valve core unit 92 can move in the axis direction of the valve chamber. Preferably, the connecting rod 71 is provided with a first installing hole 711 for installing the first valve core unit 91 and a second installing hole 712 for installing the second valve core unit 92 thereon, and the first valve core unit 91 and the second valve core unit 92 are freely embedded, through its own structural step, in the first installing hole and the second installing hole of the connecting rod 71. The above installation mode makes a certain matching gap exist between the first valve core unit and the second valve core unit and the connecting rod, and the gap can enable both the first valve core unit 91 and the second valve core unit 92 to keep joint sealing with the valve seat 30. Note that, the connecting rod 71 is made of panel veneer and formed by blanking.

As shown in FIG. 7 and FIG. 8, in the present embodiment, the second valve core unit 92 has a valve core body 921 and a connecting unit 922, and the radial dimension of the connecting unit 922 is less than that of the valve core body 921. The connecting unit 922 is used for matching the second installing hole 712; and the size makes it easy to realize compression.

Figure 15:
FIG. 15 is a length direction section structure diagram of a pressure spring of the reversing valve in FIG. 6.
Figure 16:
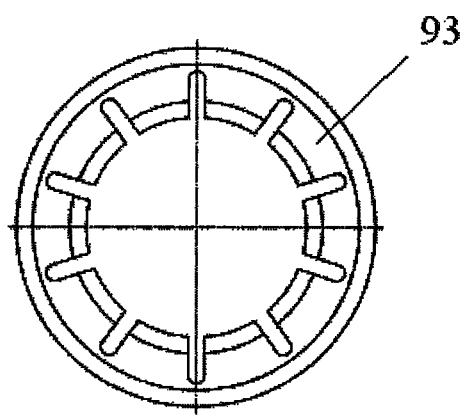
FIG. 16 is a side view of the pressure spring in FIG. 15.

As shown in FIG. 15 and FIG. 16, in the present embodiment, a pressure spring 93 is set between the connecting rod 71 and the second valve core unit 92. Because the pressure difference between the two sides of the second valve core unit 92 is very small, for ensuring its sealing performance, a disc-shaped leaf spring is added between the second valve core unit 92 and the connecting rod 71, so that the second valve core unit 92 can cling to the valve seat 30 to keep tight. Preferably, the spring is made of panel veneer and formed by blanking; for preventing a sharp edge from damaging the second valve core unit 92 and enabling the second valve core unit 92 and the connecting rod 71 to contact and fit better, the upper and under the spring are provided with edge folds.

In the embodiment 2, a surface, facing the valve seat 30, of the second valve core unit 92 has a recess. The above structure reduces a contact area between the second valve core unit 92 and the valve seat 30, so that the moving frictional resistance of the second valve core unit 92 is reduced.

As shown in FIG. 6, in the present embodiment, the reversing valve further comprises: a plurality of flow path ports correspondingly are communicated with the plurality of valve ports; the plurality of flow path ports comprise the C port is communicated with the third valve port 43, the S port is communicated with the first valve port 41, the E port is communicated with the second valve port 42, the D2 port is communicated with the fifth valve port 45 and the D1 port is communicated with the fourth valve port 44. Each of above ports is matched with its corresponding valve ports, so as to enable the connecting pipes are matched with the reversing valve to be connected to the ports, thus facilitating the connecting pipes.

Preferably, the valve chamber, the valve seat 30 and the flow path ports are first assembled with other needed parts, and then welded as a body by adopting a welding technology (flaming welding or brazing through a tunnel kiln).

The application also provides a refrigerating system; as shown in FIG. 6, the embodiment of the refrigerating system according to the application comprises a compressor 1, a first heat exchanger 3, a second heat exchanger 4, a throttle valve 2 is communicated with the first heat exchanger 3 with the second heat exchanger 4, and a reversing valve. The reversing valve is that mentioned above; an inlet end of the compressor 1 is communicated with the first valve port 41 of the reversing valve; an outlet end of the compressor 1 is communicated with the fourth valve port 44 and the fifth valve port 45 of the reversing valve respectively; the first heat exchanger 3 is communicated with the third valve port 43 of the reversing valve; the second heat exchanger 4 is communicated with the second valve port 42 of the reversing valve.

The specific working process of the refrigerating system is elaborated blow by taking that the first heat exchanger 3 is an outdoor heat exchanger, and the second heat exchanger 4 is an indoor heat exchanger for example:

When the refrigerating system runs, as shown in FIG. 6, the reversing valve is at the second preset position, the E port and the S port are communicated, the D2 port and the C port are communicated, and the D1 port is shielded by the second valve core unit 92 to close. The refrigerant in the system flows according to a full line path in the figure. Specifically, the gas output from the compressor 1 enters the valve chamber from the D2 port, then is output from the C port communicated with the D2 port, and goes through the first heat exchanger 3, the throttle valve 2 and the second heat exchanger 4 in sequence; the refrigerant output from the second heat exchanger 4 enters the E port, then is output from the S port communicated with the E port, and finally returns to the compressor 1. The above working process is a working cycle of the refrigerating system.

As shown in FIG. 6, in the present embodiment, the refrigerating system further comprises an auxiliary heat exchanger 6, and the auxiliary heat exchanger 6 can be set between the outlet end of the compressor 1 and the fifth valve port 45. The above structure makes the high-temperature and the high-pressure gas output from the compressor 1 first go through the auxiliary heat exchanger 6 to perform heat exchange; the refrigerant output from the auxiliary heat exchanger 6 enters the valve chamber from the D2 port, then is output from the C port communicated with the D2 port, and go through the first heat exchanger 3, the throttle valve 2 and the second heat exchanger 4 in sequence; the refrigerant output from the second heat exchanger 4 enters the E port, then is output from the S port communicated with the E port, and finally returns to the compressor 1. The high-temperature and the high-pressure gas output from the compressor 1 goes through the auxiliary heat exchanger 6 and releases heat. The heat released from the gas can be used for heating other substances, which can further save energy and reduce emission, thus achieving the effect of saving energy and reducing emission.

When the air conditioner needs to heat in running, an electromagnetic system functions to make the connecting rod 71 drive the first valve core unit 91 and the second valve core unit 92 to move to the first preset position (not shown in the figure), at this point, the C port is communicated with the S port, the D1 port is communicated with the E port and the D2 port is shielded by the second valve core unit 92 to close; the refrigerant in the system flows according to a dotted line path. Specifically, the gas output from the compressor 1 directly enters the D1 port without going through the auxiliary heat exchanger 6, that is, the auxiliary heat exchanger 6 does not exchanger heat, but only functions in storing a part of refrigerant, at this point, this part of refrigerant does not participate in the cycling working. The refrigerant entering the valve chamber from the D1 port is output from the E port and goes through the second heat exchanger 4, the throttle valve 2, and the first heat exchanger 3 in sequence; the refrigerant output from the first heat exchanger 3 enters the C port 4, then is output from the S port communicated with the C port, and finally returns to the compressor 1. The above working process is a working cycle of a heating system. Note that, the electromagnetic system mainly functions in moving the valve core part in the valve chamber, so as to achieve the intention of reversing the valve chamber, namely being the same as a four-way valve in the prior art.

Certainly, when the first heat exchanger 3 is the indoor heat exchanger, the second heat exchanger 4 is the outdoor heat exchanger, the auxiliary heat exchanger 6 is set between the outlet end of the compressor 1 and the fourth valve port 44; at this point, the working principle is the same as that when the first heat exchanger 3 is the outdoor heat exchanger, the second heat exchanger 4 is the indoor heat exchanger, which will not be repeated.

The skilled in the art should know that when the first heat exchanger 3 is the indoor heat exchanger, the second heat exchanger 4 is the outdoor heat exchanger, the cooling mode and the heating mode are just contrary to the above description. Moreover, as a feasible embodiment, the auxiliary heat exchanger 6 can also be communicated with the fourth valve port 44.

The above is only the preferred embodiment of the present invention and not intended to limit the present invention; for those skilled in the art, the present invention may have various modifications and changes. Any modifications, equivalent replacements, improvements and the like within the spirit and principle of the present invention shall fall within the scope of protection of the present invention.

What is claimed is:

1. A reversing valve, comprising a pilot valve and a main valve; the main valve comprises:

a valve body with a valve chamber, wherein the valve chamber is provided with a valve seat therein, and the valve seat is provided with a plurality of valve ports thereon;

a plurality of flow path ports are correspondingly communicated with the plurality of valve ports;

a sliding valve core is matched with the valve seat; and a drive component driving the sliding valve core to selectively open or close the valve ports, wherein, the plurality of valve ports comprise a first valve port, a second valve port, a third valve port, a fourth valve port, and a fifth valve port; the plurality of flow path ports comprise an S port which is communicated with the first valve port, an E port is communicated with the second valve port, a C port is communicated with the third valve port, a D1 port is communicated with the fourth valve port and a D2 port is communicated with the fifth valve port;

when the sliding valve core slides to a first preset position, the D1 port is communicated with the E port, and the S port is communicated with the C port; when the sliding valve core slides to a second preset position, the D2 port is communicated with the C port, and the S port is communicated with the E port;

the reversing valve further comprising a spring pressing flake pressing the sliding valve core against the valve seat; the spring pressing flake is provided with first elastic pressing units which are symmetrically arranged at two sides of a length direction of the spring pressing flake; the sliding valve core is an integrated structure, and there are first pressing slots matched with the first elastic pressing units at two sides of a length direction of the sliding valve core;

the spring pressing flake is further provided with a second elastic pressing unit which is arranged along the width direction of the spring pressing flake, there is also a second pressing slot matched with the second elastic pressing unit at the width direction of an approximately central part of the sliding valve core.

2. The reversing valve as claimed in claim 1, wherein when the sliding valve core is at the first preset position, the D2 port is hermetically communicated with the valve chamber; when the sliding valve core is at the second preset position, the D1 port is hermetically communicated with the valve chamber.

3. The reversing valve as claimed in claim 1, wherein the sliding valve core is separately provided with a first channel and a second channel thereon; when the sliding valve core is at the first preset position, the D1 port and the E port are communicated through the first channel, and the S port and the C port are communicated through the second channel; when the valve core is at the second preset position, the D2 port and the C port are communicated through the second channel, and the S port and the E port are communicated through the first channel.

4. The reversing valve as claimed in claim 3, wherein the reversing valve further comprising the spring pressing flake pressing the sliding valve core against the valve seat, wherein the sliding valve core comprises a first valve core provided with the first channel and a second valve core provided with the second channel; the spring pressing flake comprises a first spring pressing flake is matched with the first valve core and a second spring pressing flake is matched with the second valve core.

5. The reversing valve as claimed in claim 3, wherein the valve chamber is isolated from the first channel and the second channel hermetically.

6. The reversing valve as claimed in claim 1, wherein the sliding valve core comprises a first valve core unit and a second valve core unit which are set at interval and move synchronously; the first valve core unit is matched with the first valve port, the second valve port and the third valve port; the second valve core unit is matched with the fourth valve port and the fifth valve port; when the sliding valve core is at the first preset position, the first valve port and the third valve port are communicated through an internal channel of the first valve core unit, the second valve port and the fourth valve port are communicated through the valve chamber, and the second valve core unit blocks the fifth valve port; when the sliding valve core is at the second preset position, the first valve port and the second valve port are communicated through the internal channel in the first valve core unit, the third valve port and the fifth valve port are communicated through the valve chamber, and the second valve core unit blocks the fourth valve port.

7. The reversing valve as claimed in claim 6, wherein a surface, facing the valve seat, of the second valve core unit has a recess.

8. The reversing valve as claimed in claim 6, wherein the drive component comprises a connecting rod; the first valve core unit and the second valve core unit are installed on the connecting rod; the connecting rod is provided with a first installing hole for installing the first valve core unit and a second installing hole for installing the second valve core unit.

9. The reversing valve as claimed in claim 8, wherein the second valve core unit has a valve core body and a connecting unit; the radial dimension of the connecting unit is less than the radial dimension of the valve core body.

10. The reversing valve as claimed in claim 8, wherein a pressure spring is set between the connecting rod and the second valve core unit.

11. The reversing valve as claimed in claim 1, wherein the valve chamber is cylinder-shaped; the first valve port, the second valve port, the third valve port, the fourth valve port and the fifth valve port are set at one side of the valve chamber, and are linearly distributed in the axis direction of the valve chamber.

12. A refrigerating system, comprising: a compressor, a first heat exchanger, a second heat exchanger and a throttle valve, the throttle valve makes the first heat exchanger communicating with the second heat exchanger; wherein the refrigerating system further comprises an auxiliary heat exchanger and the reversing valve as claimed in claim 1; an inlet end of the compressor is communicated with the first valve port of the reversing valve; an outlet end of the compressor is communicated with the fourth valve port and the fifth valve port of the reversing valve respectively; the first heat exchanger is communicated with the third valve port of the reversing valve; the second heat exchanger is communicated with the second valve port of the reversing valve; the auxiliary heat exchanger is set between the outlet end of the compressor and the fourth valve port or between the outlet end of the compressor and the fifth valve port.

* * * * *